Sept. 11, 1951  J. DEUBEL  2,567,663
FLEXIBLE COUPLING FOR SHAFTS
Filed June 2, 1947
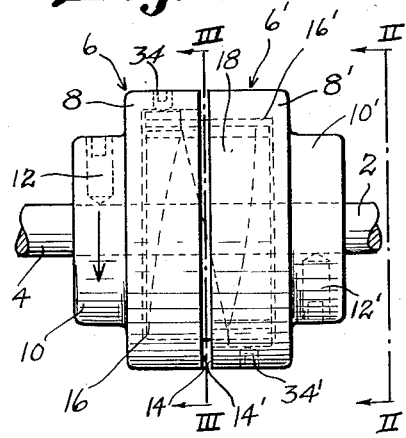
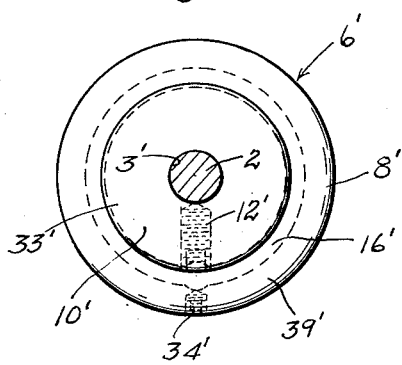
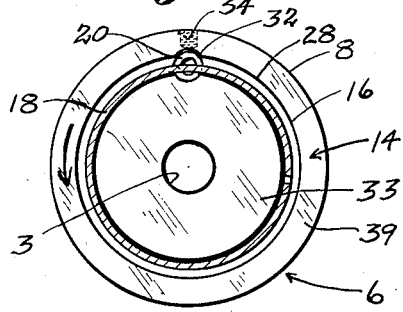
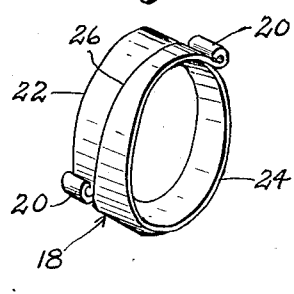
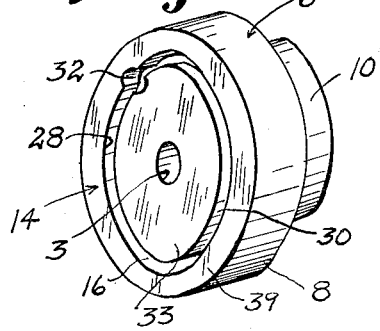
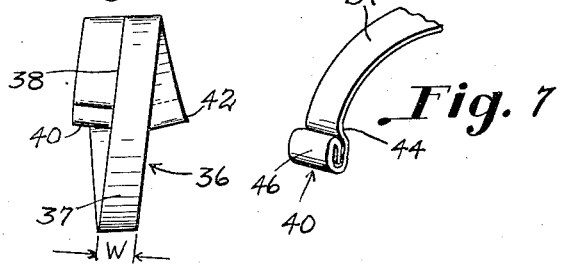
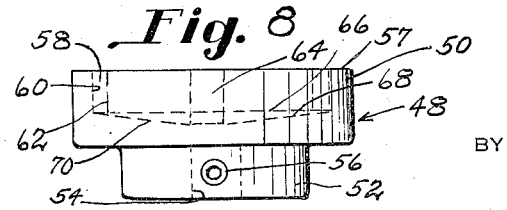
INVENTOR.
Joseph Deubel
BY Alfred W. Vibber
HIS ATTORNEY Patented Sept. 11, 1951

2,567,663

UNITED STATES PATENT OFFICE 2,567,663

FLEXIBLE COUPLING FOR SHAFTS

Joseph Deubel, Garfield, N. J.

Application June 2, 1947, Serial No. 751,759

5 Claims. (Cl. 64—12)

This invention relates to an improved flexible coupling for substantially aligned shafts.

One of the objects of the present invention is the provision of a coupling of the type indicated which is exceptionally rugged, easy to make, and simple to maintain.

A further object of the invention is the provision of such coupling which permits reasonable misalignment of the shafts without producing undue wear on the coupling or being noisy in operation when so mounted.

A further object of the invention, when employed in a preferred embodiment, is the provision of such coupling in which the two major coupling parts are interchangeable and the coupling may be employed to drive a shaft in either direction.

These and further objects of the invention will be more readily apparent in the following description of preferred embodiments thereof, as shown in the accoompanying drawing in which:

Figure 1 is a view in side elevation of a preferred embodiment of the coupling in operative driving position between two shafts;

Figure 2 is an end view of such coupling, the view being taken from a point of view along the line II—II in Figure 1;

Figure 3 is a view in vertical section through such coupling, the section being taken along the line III—III in Figure 1;

Figure 4 is a view in perspective of one embodiment of the helical connecting and driving member interposed between the coupling halves;

Figure 5 is a view in perspective of a coupling half;

Figure 6 is an end elevation of another embodiment of the helical driving and connecting member;

Figure 7 is a view in perspective of one end portion of the member shown in Figure 6; and Figure 8 is a view in side elevation of a second embodiment of a coupling half adapted to receive the helical driving member shown in Figures 6 and 7.

In Figure 1 the coupling, shown as including the two major coupling parts or coupling halves 6 and 6', is shown as connecting the two confronting substantially aligned shafts 2 and 4 in driving relationship. In the preferred embodiment, for reasons which will appear hereinafter, it is preferred that the coupling rotate in the direction of the arrows in Figures 1 and 3, and that the shaft 4 be the driving shaft, and the shaft 2 the driven shaft. However, it is possible, with such preferred embodiment, for the coupling to rotate in a direction opposite to that indicated, and for the shaft 2 to be the driving shaft and shaft 4 the driven shaft.

Each of the coupling halves 6 and 6', which are preferably although not necessarily identical, is provided with a coaxial bore 3 and 3', respectively, for the reception of the shafts 4 and 2, respectively, as shown. Each coupling half is provided with an enlarged forward end portion in the form of a flange 8 and 8', respectively, the forward confronting faces 14 and 14' of which such flanges lying substantially in planes at right angles to the axes of the bores 3 and 3'. Each coupling half is further provided with a hub 10 and 10' respectively, each of the hubs having a tapped radial hole therein receiving the set screws 12 and 12', the inner ends of which bear against the shafts, as shown, to fix the coupling halves against longitudinal movement and rotation with respect to the shafts upon which they are mounted.

Each of the coupling halves is provided on the forward face, 14 aand 14', respectively, of the flange thereof with an annular groove coaxial with the shaft receiving bore in the hub thereof. Such structure is best shown in Figures 3 and 5 in which the face 14 of the flange is shown provided with the annular groove 16, such groove extending, as shown in Figures 1 and 5, to a substantial depth into the flange. The confronting annular grooves in the two substantially identical coupling halves provide a seat or pocket within which is seated the helical driving and connecting member 18, shown most clearly in Figure 4. In the first emebodiment of the coupling, member 18 which is formed from flat stock bent helically, has substantial portions of its two outer edges 22 and 24 lying in substantially parallel planes, the confronting inner edges of the abutting portions of member 18, which lie side-by-side on the surface of a cylinder, meeting along the helical line 26. Member 18 is conveniently formed by being bent up from a flat elongated blank which tapers from minimum width at its ends to maximum width at its longitudinal center, the side edges of the blank which are to form the edges 22 and 24 of the helical member being straight and parallel from the respective ends of the blank to the center. Member 18 has, as shown in Fig. 4, a radial thickness which is a small fraction of the width of its turns at any point, and which is an even smaller fraction of such width at the longitudinal center of the member. As shown, member 18 has a total of one and one-half turns, that is, it extends throughout 540°.

The ends of member 18 are held in the respective coupling halves against rotation with respect thereto. In the coupling shown, this is accomplished by providing the ends of member 18 with enlarged portions 20 and 20', conveniently made by curling the ends thereof into outwardly extending beads. The annular groove 16 and 16', respectively, in each coupling half is provided at one location with an enlargement, which may take the form, as shown in Figure 3, of a hole 32 drilled parallel to the bore 3. Such manner of holding the member 18 in the coupling halves is ordinarily sufficient, but it is preferred, where possible, to provide additional holding means for the ends of member 18. In the embodiment shown in Figures 1 to 3, inclusive, such holding means is in the form of set screws 34 and 34' extending through a tapped bore in the outer portion of the flanges 8 and 8', the inner end of the set screw being in tight engagement with the bead, as with end 20 in Figure 3.

The coupling when made as above described, and when connected as shown in Figure 1, operates as follows:

The rotation of driving shaft 4 causes the helical driving and connecting member 18 to be wound up and thus to decrease in diameter. Ordinarily the load to be driven will be such that winding up of member 18 will continue until it binds tightly upon those parts of the flanges of the coupling halves within the annular grooves, one such inner flange being shown at 33 in Figure 3. Thereupon the load is positively taken up and driven.

It is a requirement of the invention that the helical driving and connecting member be of such configuration, relative to the coupling halves and their normal axial spacing, that substantially one turn of member 18, that is, at least approximately but no more than 360° of said member, overlap the inner flanges 33 and 33', and preferably also will overlap the outer flanges 39 and 39' of the coupling halves, such outer flanges being that part of flanges 8 and 8' which lie outside the annular grooves. Such construction stably connects the coupling halves in driving relationship, and prevents distortion and collapsing of member 18 regardless of the amount of load imposed thereon. In the preferred embodiment, as stated, member 18 is made with one and one-half turns, and is further so made, so that approximately 180° of its extent at each end thereof fits entirely within the annular groove of its respective coupling half.

The annular grooves 16 and 16', are as shown, made somewhat wider than the thickness of the elements of the turns in members 18, so that such member when seated in the pocket composed of the annular grooves has freedom to expand and contract to a limited degree, thereby making the driving action of the coupling flexible. Although member 18 may be made of the more resilient metals, such as spring steel, it is preferred to use other metals which are more "dead" in their action, that is, annealed ferrous metals, and relatively non-resilient, non-ferrous metals of adequate strength. This prevents the setting up of harmonic vibrations in the coupling which would thus yield an uneven driving therethrough. The coupling halves 6 and 6' may be made of any constructional material suitable for the purpose in hand among which are the strong durable metals, the softer die-cast metals, and, for some applications, the molded reinforced plastics.

As previously mentioned the direction of drive of the coupling indicated in Figures 1 and 3 may be reversed. In such case, when the driving load is imposed upon the coupling, the helical driving connecting member 18 expands into contact with the outer flanges 39 and 39' outside grooves 16 and 16'. For heavy loads, however, such mode of operation is ordinarily not preferred because of the bursting stress which is imposed upon the relatively weaker outer flanges 39 and 39'.

In the second embodiment of the coupling, indicated in Figures 6, 7, and 8, the helical driving and connecting member, shown generally at 36, is made from flat stock 37, the blank from which it was made being of a uniform width W. Member 36 has, as shown in Figs. 6 and 7, a radial thickness which is a small fraction of the width W of its turns. Such blank is coiled to form a helix of one and one-half turns, the confronting edges of which lie on a cylinder and abut along the helical line 38. The opposite ends of the helix are provided with an enlargement 40, formed as shown in Figure 7, by making an inward bend 44 and an outwardly turned bead 46.

By reason of such formation of helical member 36, the outer edges of the member do not lie generally in parallel planes but on the contrary, are inclined to the longitudinal axis of the helix at angles other than 90°. Consequently, coupling halves employed with such driving member are formed as shown in Figure 8, in which a coupling half is indicated at 48, the main flange thereon is shown at 50, and the hub thereon is denoted 52. Such hub is provided with a shaft receiving bore 54 and with a shaft engaging set screw 56. The forward face 57 of flange 50 is provided with an annular groove 58, the outer wall of which is designated 60, and the inner wall which is shown at 62. The annular groove is provided with an enlargement 64 for the reception of one of the ends 40 and 42 of member 36. Annular groove 58 is provided throughout most of its extent with a bottom 66 lying at right angles to the axis of bore 54. In that portion beneath enlargement 64, the bottom of the groove is made somewhat deeper, and on both sides of such deeper portion the main part of the bottom of the groove is connected thereto by inclined bottom portions 68 and 70, respectively, as shown in Figure 8.

The flexible coupling for shafts of the present invention gives a somewhat cushioned drive between shafts, at least until the load is taken up, and allows reasonable misalignment of shafts without imposing undue wear on the coupling. The coupling may be made of any size which is necessary to carry the required load in any particular application. In its preferred embodiment the coupling halves, being identical, are interchangeable, and, as explained, the coupling may be driven in either direction. Should the helical driving and connecting member ever become lost or broken, a temeporary or permanent replacement member may be easily and cheaply made.

I have above described and illustrated preferred embodiments of the flexible coupling for shafts of the present invention. It is to be understood, however, that the coupling of the invention is capable of considerable variation as to details, and that the invention is therefore defined by the following claims.

I claim as new the following:

1. The combination of a driving member rotating about its axis, such member having a face at its forward end, a driven member rotating about an axis substantially coincident with that of the driving member, the driven member having an end face confronting and spaced from the forward end of the driving member, a driving and connecting element between the two members, such element being in the form of a thin band of dead metal wound helically in such direction as to be wound up by the driving member, the elements of the turns of said driving element being flat and lying parallel to the axes of the driving and driven members, the turns of the helical driving element having an axial width which is much greater than the radial thickness of such turns, means for connecting each end of the driving element to its respective member to prevent substantial rotation therebetween, the driving and driven members and the driving element being so constructed and arranged that the driving element overlaps both the driving and driven members throughout at least one continuous turn of substantially but no more than 360 degrees.

2. The combination of a driving member rotating about its axis, such member having a face at its forward end positioned substantially at right angles to the axis of such member, a driven member rotating about an axis substantially coincident with that of the driving member, the driven member having an end face confronting and spaced from the forward end of the driving member and located in a plane substantially at right angles to the axis of such driven member, confronting faces of the two members being provided with confronting annular grooves substantially coaxial with the axes of the respective members, a driving and connecting element seated in the pocket formed by such two confronting annular grooves, such driving element being in the form of a thin band of dead metal wound in helical form, the elements of the turns of said driving element being flat and lying on an imaginary cylinder the axis of which is substantially coaxial with the driving and driven members, the turns of the helical driving member having an axial width which is much greater than the radial thickness of such turns, confronting portions of the turns of the helical member substantially abutting each other, means for connecting each end of the driving element to its respective member to prevent substantial rotation therebetween, the driving and driven members and the driving element being so constructed and arranged that the driving element overlaps both the driving and driven members throughout at least one continuous turn of substantially but no more than 360 degrees, the helical driving element constituting the sole connection between the driving and driven members.

3. A flexible coupling for substantially aligned shafts comprising two main coupling parts, each such coupling part including a means for attaching the coupling part to a shaft, a helically wound connecting and driving element in the form of a thin band of dead metal adapted for interposition between the coupling parts, the elements of the turns of said driving element being flat and lying on an imaginary cylinder the axis of which is coaxial with the shafts, the turns of the helical driving element having an axial width which is much greater than the radial thickness of such turns, confronting portions of the turns of the helical member substantially abutting each other, means for connecting each end of the driving element to its respective coupling part to prevent substantial rotation therebetween, the coupling parts and the driving element being so constructed and arranged that, when the flanges of the coupling parts confront and adjoin each other in operative relationship, the driving element overlaps the flanges of both coupling parts throughout at least one continuous turn of substantially but no more than 360 degrees.

4. A flexible coupling for substantially aligned shafts comprising two main coupling parts, each such coupling part including a means for attaching the coupling part to a shaft, each such coupling part having a flange, the forward face of such flange extending at right angles to such shaft, there being an annular groove coaxial with the shaft in such forward face of the flange, a helically wound connecting and driving element in the form of a thin band of dead metal adapted to be received in the pocket formed by the annular grooves in the flanges on the coupling parts when such parts are in confronting operative relationship, the elements of the turns of said driving element being flat and lying parallel to the axis of the driving member, the turns of the helical driving member having an axial width which is much greater than the radial thickness of such turns, confronting portions of the turns of the helical member substantially abutting each other, means for connecting each end of the driving element to its respective coupling part to prevent substantial rotation therebetween, the coupling parts and the driving element being so constructed and arranged that, when the flanges of the coupling parts confront and adjoin each other in operative relationship, the driving element overlaps the flanges of both coupling parts throughout at least one continuous turn of substantially but no more than 360 degrees.

5. A flexible coupling for substantially aligned shafts comprising two main coupling parts, each such coupling part including a means for attaching the coupling part to a shaft, each coupling part having a flange, the forward face of such flange extending at right angles to such shaft, there being an annular groove coaxial with the shaft in such forward face, a helically wound connecting and driving element in the form of a thin band of dead metal adapted to be received in the pocket formed by the annular grooves in the coupling parts when such parts are in confronting operative relationship, the elements of the turns of said driving element being flat and lying parallel to the axis of the driving member, the turns of the helical driving member having an axial width which is much greater than the radial thickness of such turns, confronting portions of the turns of the helical member substantially abutting each other, means for connecting each end of the driving element to its respective coupling part to prevent substantial rotation therebetween, the coupling parts and the driving element being so constructed and arranged that, when the flanges of the coupling parts confront and adjoin each other in operative relationship, the driving element overlaps the flanges of both coupling parts throughout at least one continuous turn of substantially but no more than 360 degrees, each end of the helical driving element being received in its respective annular groove throughout at least 180 degrees of its extent, said helical driving element constituting the sole connection between the coupling parts.

JOSEPH DEUBEL.

REFERENCES CITED

The following references are of record in the file of this patent:

UNITED STATES PATENTS

| Number | Name | Date |
|---|---|---|
| 1,242,577 | Milne et al. | Oct. 9, 1917 |
| 1,617,775 | Starkey | Feb. 15, 1927 |
| 1,935,683 | Wemp | Nov. 21, 1933 |
| 2,021,413 | Gille | Nov. 19, 1935 |

FOREIGN PATENTS

| Number | Country | Date |
|---|---|---|
| 339,453 | Great Britain | 1930 |
| 481,928 | Germany | 1929 |